(12) United States Patent
Xing et al.

(10) Patent No.: US 10,568,184 B2
(45) Date of Patent: Feb. 18, 2020

(54) PRESENCE SENSING METHOD, PRESENCE SENSING DEVICE AND LIGHT SYSTEM

(71) Applicant: GE Lighting Solutions, LLC, East Cleveland, OH (US)

(72) Inventors: Dong Xing, ShangHai (CN); Aijun Wang, ShangHai (CN); Xin Luo, ShangHai (CN); Xin Zhou, ShangHai (CN); Jiyong Zhang, ShangHai (CN); Charles Shi, ShangHai (CN); Fanbin Wang, ShangHai (CN)

(73) Assignee: Consumer Lighting (U.S.), LLC, Norwalk, CT (US)

( * ) Notice: Subject to any disclaimer, the term of this patent is extended or adjusted under 35 U.S.C. 154(b) by 0 days.

(21) Appl. No.: 16/452,172

(22) Filed: Jun. 25, 2019

(65) Prior Publication Data

US 2019/0394854 A1    Dec. 26, 2019

(30) Foreign Application Priority Data

Jun. 25, 2018  (CN) .......................... 2018 1 0660549

(51) Int. Cl.
  *H05B 37/02*    (2006.01)
(52) U.S. Cl.
  CPC ..... *H05B 37/0227* (2013.01); *H05B 37/0281* (2013.01)

(58) Field of Classification Search
  CPC .................................................. H05B 37/0281
  USPC ....................................... 315/360; 340/573.1
  See application file for complete search history.

(56) References Cited

U.S. PATENT DOCUMENTS

| 2012/0296487 | A1* | 11/2012 | Leinen | ..................... F24F 11/30 |
| | | | | 700/296 |
| 2014/0103814 | A1* | 4/2014 | Both | ................... H05B 37/0227 |
| | | | | 315/153 |
| 2015/0286948 | A1* | 10/2015 | Luca | ...................... G05B 15/02 |
| | | | | 706/48 |
| 2017/0208673 | A1* | 7/2017 | Schlangen | ......... H05B 37/0218 |
| 2019/0230769 | A1* | 7/2019 | Magielse | ........... H05B 37/0227 |

* cited by examiner

*Primary Examiner* — Thuy V Tran
(74) *Attorney, Agent, or Firm* — Wood IP LLC

(57) ABSTRACT

A presence sensing method for a light comprises detecting a presence of a user by a sensing module having a first sensitivity while the light is off; turning on the light when identifying the presence of the user and keeping the light on for a delay time period which has a preset length; increasing a sensitivity of the sensing module to a second sensitivity after turning on the light; detecting actions of the user by the sensing module having the second sensitivity while the light is on; determining a length of a next delay time period based on the actions of the user during the previous delay time period immediately prior to the next delay time period; and keeping the light on for the next delay time period.

12 Claims, 3 Drawing Sheets

PRESENCE SENSING METHOD, PRESENCE SENSING DEVICE AND LIGHT SYSTEM

BACKGROUND

Embodiments of the present disclosure relate to presence sensing methods, presence sensing devices and light systems.

In recent years, lighting devices with presence sensing function have been widely used, because the illumination device has advantages of saving energy and prolonging the service life.

Conventional lighting devices with presence sensing function are usually difficult to ensure high sensitivity and reliability at the same time. When the sensitivity is high, the lighting device is easy to be triggered by mistake, resulting in a waste of energy. When the sensitivity is low, the lighting device will often turn off automatically, thus affecting the normal use of users.

Therefore, it is desirable to provide new presence sensing methods, presence sensing devices and light systems to solve the above-mentioned problem.

BRIEF DESCRIPTION

A presence sensing method for a light, comprises detecting a presence of a user by a sensing module having a first sensitivity while the light is off; turning on the light when identifying the presence of the user and keeping the light on for a delay time period which has a preset length; increasing a sensitivity of the sensing module to a second sensitivity after turning on the light; detecting actions of the user by the sensing module having the second sensitivity while the light is on; determining a length of a next delay time period based on the actions of the user during the previous delay time period immediately prior to the next delay time period; and keeping the light on for the next delay time period.

A presence sensing device for a light comprises a sensing module and a controller. The sensing module is configured to detect a presence of a user with a first sensitivity while the light is off and detect actions of the user with a second sensitivity higher than the first sensitivity while the light is on. The controller is coupled with the sensing module and configured to: turn on the light if the sensing module identifies the presence of the user while the light is off and set a preset length for a delay time period during which the light is on, determine a length of a next delay time period based on the actions of the user during the previous delay time period immediately prior to the next delay time period, and set the delay time period as the determined length.

A light system, comprises a light and a presence sensing device. The presence sensing device is coupled with the light and comprises a sensing module and a controller. The sensing module is configured to detect a presence of a user with a first sensitivity while the light is off, and detect actions of the user with a second sensitivity higher than the first sensitivity while the light is on. The controller is coupled with the sensing module and configured to: turn on the light if the sensing module identifies the presence of the user while the light is off and set a preset length for a delay time period during which the light is on, determine a length of a next delay time period based on the actions of the user during the previous delay time period immediately prior to the next delay time period, and set the delay time period as the determined length.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

In an effort to provide a concise description of these embodiments, not all features of an actual implementation are described in one or more specific embodiments. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort would nevertheless be a routine undertaking of design, fabrication, and manufacture for those of ordinary skill having the benefit of the present disclosure.

Unless defined otherwise, technical and scientific terms used herein have the same meaning as is commonly understood by one of ordinary skill in the art to which the present disclosure belongs. The terms "first," "second," "third," "fourth," and the like, as used herein do not denote any order, quantity, or importance, but rather are used to distinguish one element from another. Also, the terms "a" and "an" do not denote a limitation of quantity, but rather denote the presence of at least one of the referenced items. The term "or" is meant to be inclusive and mean either any, several, or all of the listed items. The use of "including," "comprising," or "having," and variations thereof herein are meant to encompass the items listed thereafter and equivalents thereof as well as additional items.

Embodiments of the present disclosure relate to a light system comprising a presence sensing device. The light system has high sensitivity and reliability at the same time, and it can be widely applied in in various lighting occasions.

Figure 1:
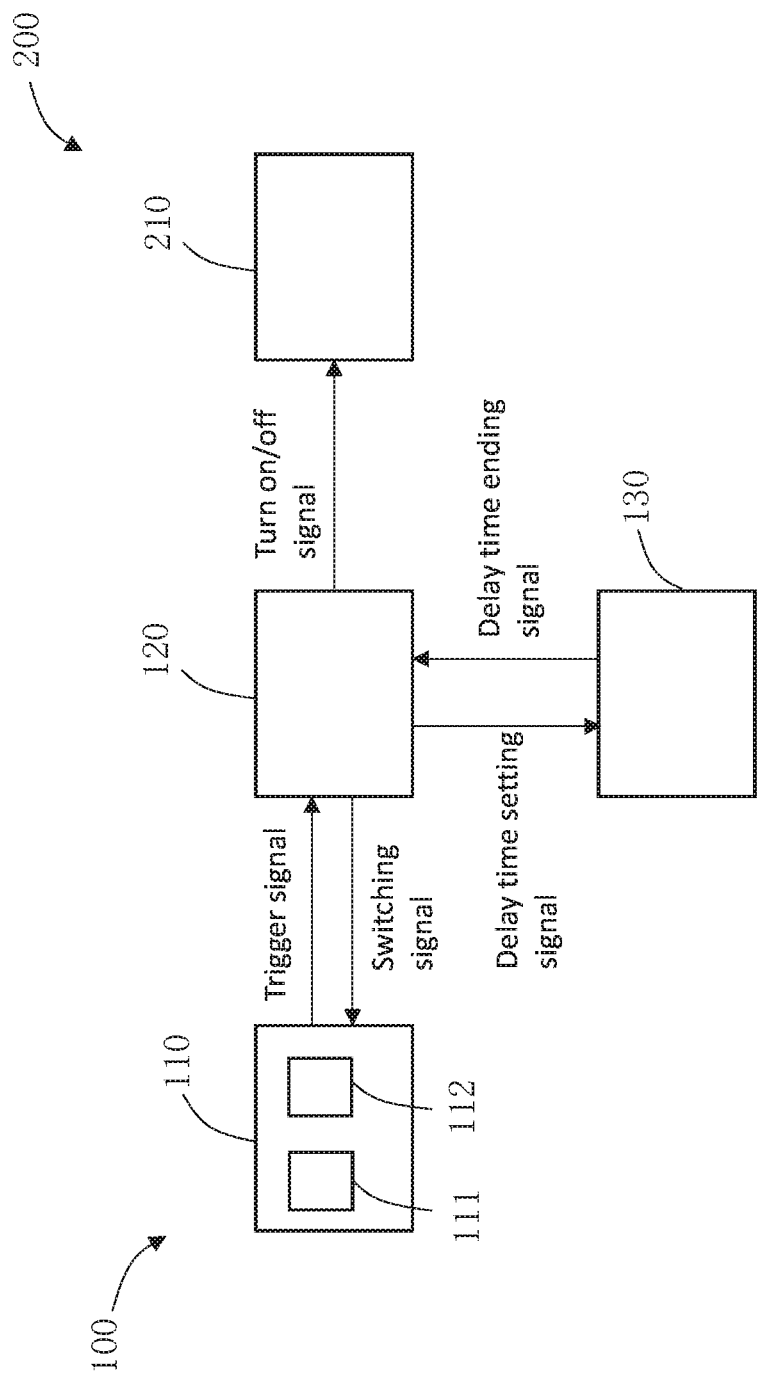
FIG. 1 is a sketch view of a light system in accordance with an exemplary embodiment of the present disclosure.

FIG. 1 is a sketch view of a light system 200 according to an exemplary embodiment of the present disclosure. Referring to FIG. 1, the light system 200 comprises a light 210 and a presence sensing device 100 coupled to the light 210. The presence sensing device 100 comprises a sensing module 110, a controller 120 and a timer 130. The sensing module 110 and the timer 130 are coupled to the controller 120, and the controller 120 is coupled with the light 210.

The sensing module 110 is configured to detect a presence of a user with a first sensitivity while the light 210 is off and detect actions of the user with a second sensitivity higher than the first sensitivity while the light 210 is on. The "sensitivity" of the sensing module used herein refers to an impact of an input variation of the sensing module on its output. When the input variation is the same, the greater the impact on its output, the higher the sensitivity is. In some embodiments, the sensitivity can be increased by reducing a sensing threshold of the sensing module.

The sensing module 110 is configured to receive an external signal, for example, infrared signals from the user, infrared reflective signals, ultrasonic reflective signals, etc. The sensing module 110 is also configured to process the signal received to identify signals representing human motions. Specifically, when the light is turned off, the sensing module 110 compares the signal received with a first sensing threshold. When an amplitude of the signal received is greater than the first sensing threshold, the sensing module 110 identifies the signal as a human motion signal which indicates a presence of a user. When the light is on, the sensing module 110 compares the signal received with a second sensing threshold less than the first sensing threshold. When the amplitude of the received signal is greater than the second sensing threshold, the sensing module 110 identifies the signal as a human motion signal which indicates that the user is still present. In this way, most of environmental disturbances can be filtered out while the light is off to prevent mis-triggering, thereby saving energy and prolonging a service life of the light. At the same time, the light system has a higher sensitivity while the light is on to identify small motions of the user, so as to keep the light on and ensure good user experience.

In the embodiment shown in FIG. 1, the sensing module 110 comprises a first sensing unit 111 having a first sensitivity and a second sensing unit 112 having a second sensitivity. When the light 210 is turned off, the first sensing unit 111 works, and the second sensing unit 112 does not work. When the light 210 is turned on, the first sensing unit 111 does not work, and the second sensing unit 112 works. The first sensing unit 111 has a first sensing threshold. The second sensing unit 112 has a second sensing threshold which is less than the first sensing threshold. When the light is switched from the off state to the on state, the controller 120 is configured to send a sensing unit switching signal to the sensing module 110 so that the first sensing unit 111 stops working and the second sensing unit 112 starts working.

In other embodiments, the sensitivity of the sensing module 110 is adjustable. When the light 200 is turned off, the sensitivity of the sensing module 110 is set as the first sensitivity. When the light 200 is turned on, the sensitivity of the sensing module 110 is adjusted (i.e. increased) to the second sensitivity. When the light is switched from the off state to the on state, the controller 120 is configured to transmit a sensitivity adjustment signal to the sensing module 110 so that the sensitivity of the sensing module 110 is switched from the first sensitivity to the second sensitivity.

When the sensing module 110 identifies the presence of the user while the light 210 is off, it sends a trigger signal to the controller 120, which receives the trigger signal to turn the light 210 on and sets a preset length for a delay time period during which the light 210 is on. In some embodiments, the controller 120 turns on the light by sending a turn-on signal to the light 210.

The controller 120 is also configured to send a switching signal or a sensitivity adjustment signal to the sensing module 110 after turning on the light 210, in order to increase the sensitivity of the sensing module 110 from the first sensitivity to the second sensitivity. In this way, the sensing module 110 detects the user's motion with the second sensitivity while the light is on.

In some embodiments, the controller 120 is configured to set the length of the delay time period by sending a delay time setting signal to the timer 130. The timer 130 is configured to send a delay time ending signal to the controller 120 at the end of the current delay time period.

After receiving the delay time ending signal from the timer 130, the controller determines a length of a next delay time period based on the actions of the user during the previous delay time period immediately prior to the next delay time period. Then, the delay time period is set as the determined length. In this way, the light 210 will keep on during the next delay time period with the determined length.

In some embodiments, the controller 120 is configured to determine the length of the next delay time period based on times and amplitudes of the actions of the user during the previous delay time period. For example, if the time of the actions is more, or the amplitude of the actions is less during the previous delay time period, the length of the next delay time period will be increased more on the basis of the length of the last delay time period. Otherwise, if the time of the actions is less or the amplitude of the actions is greater during the previous delay time period, the length of the next delay time period will be reduced more on the basis of the length of the last delay time period, In other embodiments, the controller is configured to determine the length of the next delay time period based on a frequency and an amplitude of the user's actions during the previous delay time period.

If no action of the user is detected during the last delay time period, the controller 120 will turn off the light 210. Specifically, the controller 120 is configured to turn off the light by sending a turn-off signal to the light 210.

In some embodiments, the controller 120 decreases a luminance of the light before turning off the light 210. For example, the controller 120 reduces the luminance of the light to 50% of its normal working state, in order to notify the user that the light is about to turn off. If the user is still using the light at this moment, the user can trigger the light to turn on again by actions. If the user has left at this moment, i.e., the controller will not receive a signal of re-triggering, and then the controller will turn off the lamp after a period of time.

Figure 2:
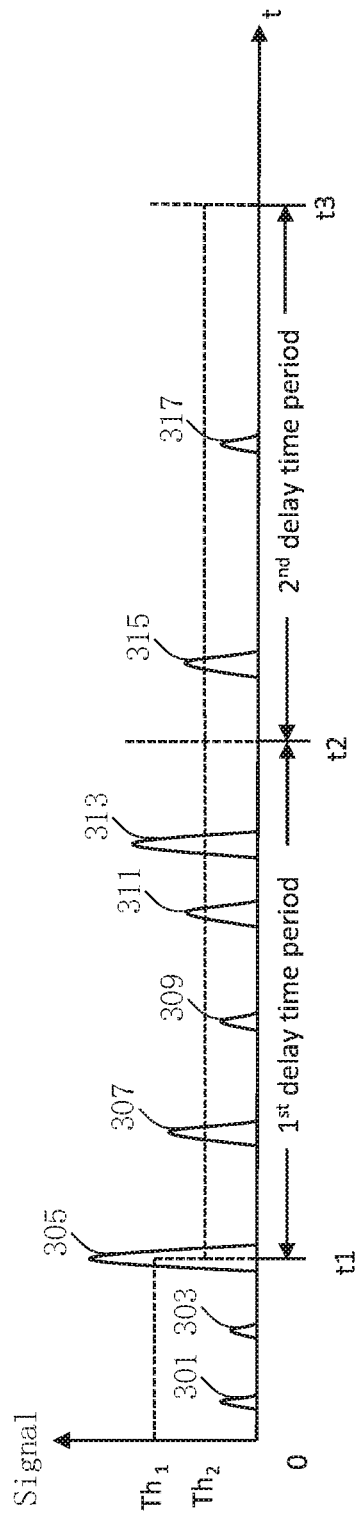
FIG. 2 is a timing diagram of a sensing module in accordance with an exemplary embodiment of the present disclosure.

FIG. 2 is a timing diagram of a sensing module in accordance with an exemplary embodiment of the present disclosure. Referring to FIG. 2, the light is off during the time period from 0 to t1, and the light is on during the time period from t1 to t3, wherein the time period from t1 to t2 is referred to as a first delay time period, and the time period from t2 to t3 is referred to as a second delay time period. Number 301-317 point to signals received by the sensing module in during the time period from 0 to t3.

Firstly, the light is turned off during the time period 0-t1, and the sensing module is configured to receive signals from outside and compare the received signals with the first sensing threshold Th1. As can be seen from FIG. 2, the sensing module receives the signals 301, 303, 305 during the time period 0-t1, and the amplitudes of the signals 301, 303 are lower than the first sensing threshold Th1, so the sensing module does not identify the signals 301, 303 as human motion signals. The amplitude of the signal 305 is higher than the first sensing threshold Th1, so the sensing module identifies the signal 305 as a human motion signal, and then sends a trigger signal to the controller. Afterwards, the light is turned on under the control of the controller, and the controller sets the first delay time period as a preset length.

During the time period t1-t2, the light is on, and the sensing module continues receiving signals from the outside and compares the received signals with the second sensing threshold Th2. As can be seen from FIG. 2, the sensing module receives signals 307, 309, 311, 313 during the time period t1-t2. The signal 309 has an amplitude lower than the second sensing threshold Th2, so the sensing module does not identify it as a human motion signal. Amplitudes of the signals 307, 311, 313 are higher than the second sensing threshold Th2, so the sensing module identifies these signals as human motion signals, and sends information of these human motion signals, such as amplitudes and occurrence moment, to the controller.

At the end of the first delay time period, i.e. the moment t2, the controller calculates the length of the next delay time period, i.e. the second delay time period, based on the information of the human motion signals identified by the sensing module during the time period t1-t2, such as times, amplitudes and frequency. Then, the controller sends a delay time setting signal to the timer to set the second delay time period as the calculated length.

During the time period t2-t3, the light is still on, and the sensing module continues receiving signals from the outside and compares the received signals with the second sensing threshold Th2. As can be seen from FIG. 2, the sensing module receives the signals 315 and 317 during the time period t2-t3. The signal 315 has an amplitude higher than the second sensing threshold Th2, so the sensing module identify it as a human motion signal. The signal 317 has an amplitude lower than the second sensing threshold Th2, so the sensing module does not identify it as a human motion signal.

Similarly, at the end of the second delay time period, i.e. at moment t3, the controller calculates the length of the next delay time period based on the information of the human motion signals identified by the sensing module during the time period t2-t3, and sends a delay time setting signal to the timer to set the next delay time period as the calculated length. Similar steps are repeated until no human motion signal is detected during a delay time period, and then the controller turns off the light.

Embodiments of the present disclosure also relates to a presence sensing method for a light.

Figure 3:
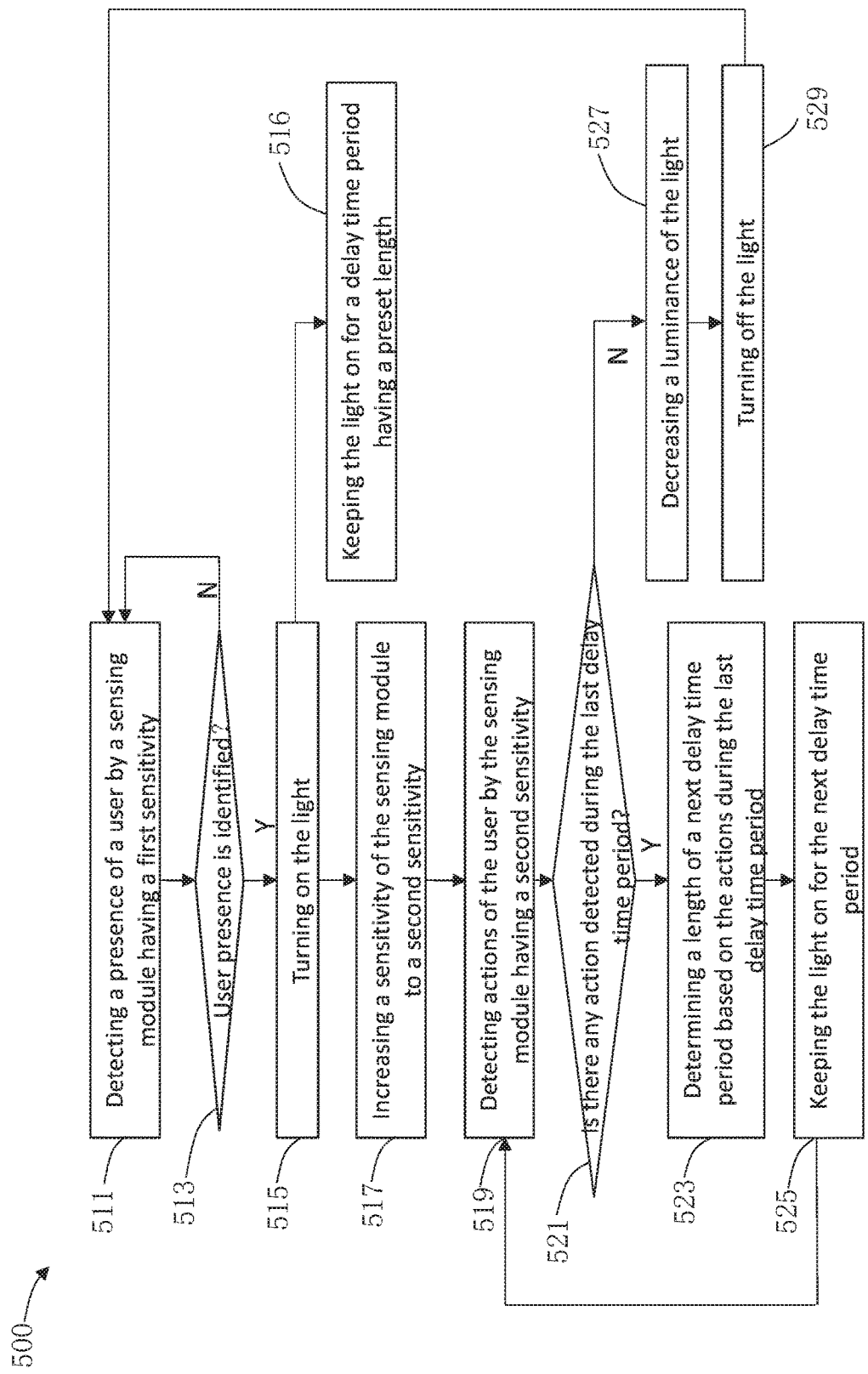
FIG. 3 is a flow chart illustrating a presence sensing method in accordance with an exemplary embodiment of the present disclosure.

Referring to FIG. 3, a presence sensing method 500 for a light comprises steps 511 to 529.

Firstly, as shown in step 511, a presence of a user is detected by a sensing module having a first sensitivity while the light is off.

Subsequently, step 513 relates to determining whether the presence of the user is identified. If the presence of the user is not identified, step 511 is repeated to continue to detect the presence of the user. If the presence of the user is identified, step 515 is executed, i.e.: turning on the light.

Step 516 relates to keeping the light on for a delay time period which has a preset length after turning on the light. Step 517 relates to increasing a sensitivity of the sensing module to a second sensitivity. In some embodiments, the step of increasing the sensitivity of the sensing module comprises decreasing a sensing threshold of the sensing module.

Subsequently, actions of the user are detected by the sensing module having the second sensitivity while the light is on, as shown in step 519.

Step 521 relates to determining whether there is any action detected during the last delay time period.

If there is no action detected during the last delay time period, step 527 will be executed, i.e.: decreasing a luminance of the light, and then the light is turned off, as shown in step 529. After turning off the light, step 511 can be repeated, i.e.: detecting the presence of the user by the sensing module having the first sensitivity, and then subsequent steps will also be repeated.

If some actions are detected during the last delay time period, a length of a next delay time period will be determined based on the actions of the user during the previous delay time period immediately prior to the next delay time period, as shown in step 523. Subsequently, step 525 relates to keeping the light on for the next delay time period. In some embodiments, the length of the next delay time period is determined based on times and amplitudes of the actions of the users during the previous delay time period.

Afterwards, step 519 is repeated to continue to detect the action of the user, and then subsequent steps will also be repeated.

As will be understood by those familiar with the art, the present disclosure may be embodied in other specific forms without depending from the spirit or essential characteristics thereof. Accordingly, the disclosures and descriptions herein are intended to be illustrative, but not limiting, of the scope of the disclosure which is set forth in the following claims.

What we claim is:

1. A presence sensing method for a light, comprising:
   detecting a presence of a user by a sensing module having a first sensitivity while the light is off;
   turning on the light when identifying the presence of the user and keeping the light on for a delay time period which has a preset length;
   increasing a sensitivity of the sensing module to a second sensitivity after turning on the light;
   detecting actions of the user by the sensing module having the second sensitivity while the light is on;
   determining a length of a next delay time period based on the actions of the user during the previous delay time period immediately prior to the next delay time period; and
   keeping the light on for the next delay time period.

2. The method according to claim 1, further comprising turning off the light if no action is detected during the last delay time period.

3. The method according to claim 2, further comprising decreasing a luminance of the light before turning off the light.

4. The method according to claim 1, wherein the determining the length of the next delay time period comprises determining the length of the next delay time period based on times and amplitudes of the actions of the users during the previous delay time period.

5. The method according to claim 1, wherein increasing the sensitivity of the sensing module comprises decreasing a sensing threshold of the sensing module.

6. A presence sensing device for a light, comprising:
   a sensing module, configured to detect a presence of a user with a first sensitivity while the light is off, and detect actions of the user with a second sensitivity higher than the first sensitivity while the light is on; and
   a controller, coupled with the sensing module and configured to:
   turn on the light if the sensing module identifies the presence of the user while the light is off and set a preset length for a delay time period during which the light is on,
   determine a length of a next delay time period based on the actions of the user during the previous delay time period immediately prior to the next delay time period, and
   set the delay time period as the determined length.

7. The device according to claim 6, wherein the controller is configured to turn off the light if no action is detected during the last delay time period.

8. The device according to claim 6, further comprising: a timer, coupled with the controller and configured to send an end signal to the controller when the current delay time period ends.

9. The device according to claim 6, wherein the sensing module comprises a first sensing unit having the first sensitivity and a second sensing unit having the second sensitivity.

10. The device according to claim 9, wherein the first sensing unit has a first sensing threshold, and the second sensing unit has a second sensing threshold which is lower than the first sensing threshold.

11. The device according to claim 6, wherein the controller is configured to determine the length of the next delay time period based on times and amplitudes of the actions during the previous delay time period.

12. A light system, comprising:
a light; and
a presence sensing device coupled with the light, the presence sensing device comprising:
  a sensing module, configured to detect a presence of a user with a first sensitivity while the light is off, and detect actions of the user with a second sensitivity higher than the first sensitivity while the light is on, and
  a controller, coupled with the sensing module and configured to:
  turn on the light if the sensing module identifies the presence of the user while the light is off and set a preset length for a delay time period during which the light is on,
  determine a length of a next delay time period based on the actions of the user during the previous delay time period immediately prior to the next delay time period, and
  set the delay time period as the determined length.

* * * * *